Dec. 6, 1932.  G. A. MONTGOMERY  1,889,870
INTERIOR SHOULDER SINGLE PIECE TOOL JOINT
Filed March 27, 1931  2 Sheets-Sheet 2

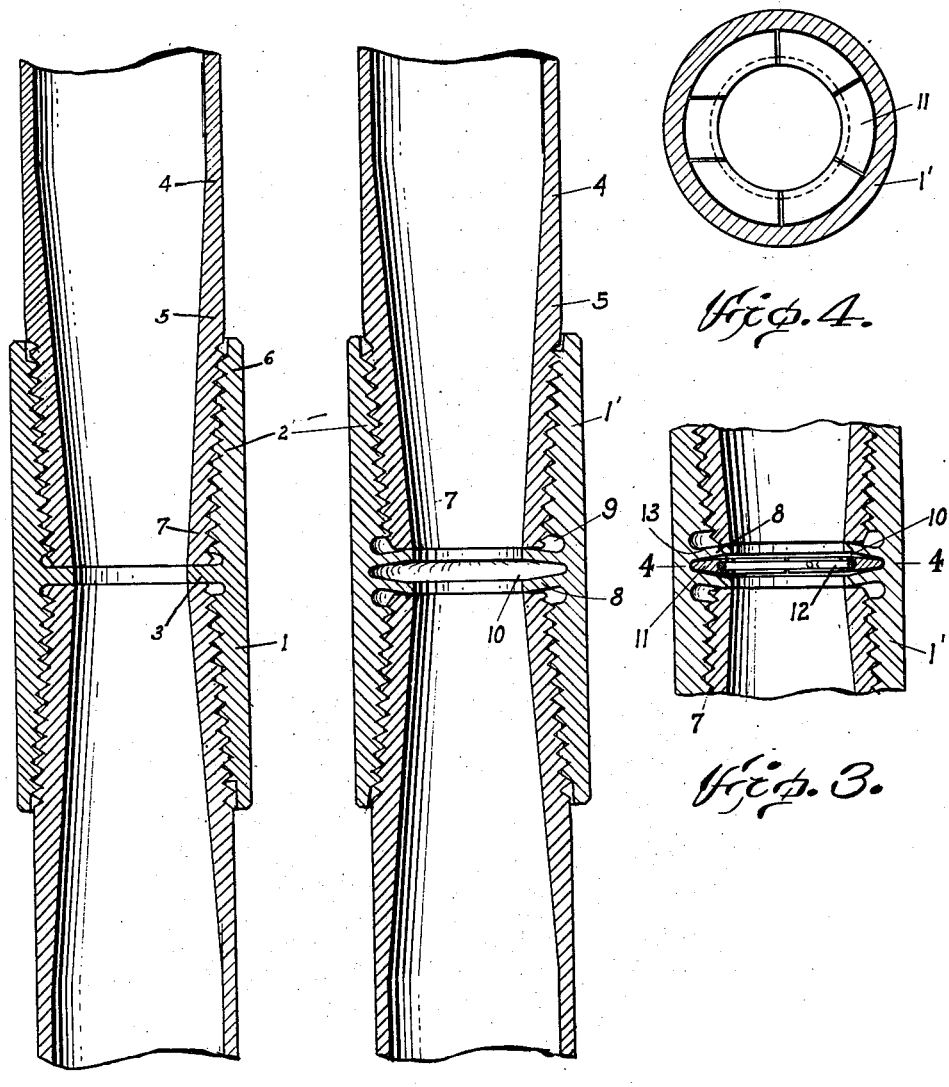

G. A. MONTGOMERY INVENTOR
BY Jesse R. Stone
ATTORNEY

Patented Dec. 6, 1932

1,889,870

UNITED STATES PATENT OFFICE

GUSTAVUS A. MONTGOMERY, OF DALLAS, TEXAS

INTERIOR SHOULDER SINGLE PIECE TOOL JOINT

Application filed March 27, 1931. Serial No. 525,749.

My invention relates to couplings or tool joints for connecting together sections of pipe or drill stem such as are used in rotary deep well drilling operations. Such drill stem is employed in rotating the drill employed in rotary drilling and to conduct flushing fluid to the drill to carry away the cuttings therefrom. It must, therefore, withstand a heavy torsional strain at the joints tending to screw the said joints tightly together; and must also be fluid tight to prevent leakage of liquid at the said joints.

It is also found that where the well is deep and the drill stem becomes long, the torsion on the stem produced at the upper end of the well in rotating the drill at the lower end, has the effect of twisting or winding up of the stem somewhat so that when the engagement of the drill with the bottom is released by raising the drill or the like, then the drill stem unwinds through its resiliency and some of the joints tend to unscrew through the back lash produced.

It is an object of my invention to provide a joint which will tend to resist unscrewing of the threaded connection between the pipe sections and the joints and to maintain a seal at the joint even where a certain amount of unscrewing has occurred.

I further desire to provide an interior shoulder in the coupling against which the pipe ends may contact, which will take the end thrust of screwing the pipe sections into the coupling and make a seal at the pipe ends, preventing leakage.

It is a further object to make the interior shoulder on the pipe resilient so as to exert a yieldable friction contact with the pipe ends so as to assist in preventing unscrewing, even where the joint is not screwed up to its limit. This also allows for tightening of the joint where wear and strain upon the box of the joint has occurred.

I also desire to provide against breakage by undue strain upon the resilient shoulders within the couplings.

It is a further object to provide an internally upset pipe section with an acutely tapered and coarsely threaded end to cooperate with said coupling to form a tight joint. The wall of the upset tapered end of the pipe being of approximately uniform thickness, a Venturi effect is produced at the joint, which is of value.

I have a further object to provide a ring of compressible material at the joint, said ring being adapted to flow under predetermined high pressures so as to allow a slight screwing up of the joint to take up for wear. I wish to provide at the joint means to resist unscrewing to a certain degree and also means to allow the joint to maintain a seal even after wear has occurred.

In the drawings herewith, Fig. 1 is a central longitudinal section through a tool joint and upset pipe involving my invention.

Fig. 2 is a similar section showing a slightly different embodiment thereof.

Fig. 3 is a broken detail showing a different resilient shoulder provided with means to prevent undue strain upon the yielding shoulder.

Fig. 4 is a transverse section taken upon the plane 4—4 of Fig. 3.

Figs. 5, 6, 7 and 8 each shows a central longitudinal section through the intermediate portion of a one-piece tool joint and illustrating different embodiments of my idea of employing a compressible ring at the ends of the pipe sections to allow tightening of the joint.

Figure 9:
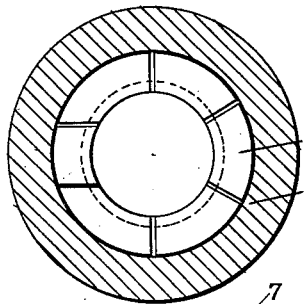
Figure 5:
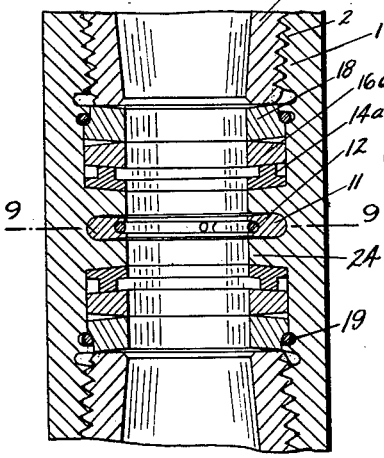

Fig. 9 is a transverse section on the plane 9—9 of Fig. 5.

Figure 10:
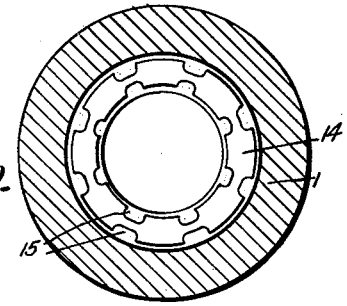
Figure 7:
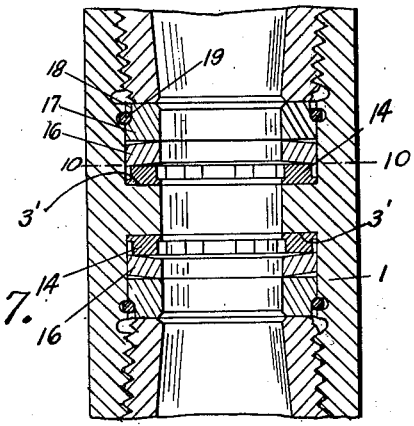

Fig. 10 is a similar transverse section on the plane 10—10 of Fig. 7.

This application is a continuation in part of the co-pending application of Gustavus A. Montgomery for tubular couplings filed June 24, 1929, Serial No. 373,356.

In the embodiment of the invention shown in Fig. 1, the tool joint coupling 1 is shown as having coarsely threaded inwardly tapered boxes 2 at each end. Midway of the ends of the coupling is an inwardly projecting annular flange 3 of sufficient width to bear against the full thickness of the ends of the pipe 4. The opposite faces of the flange 3 are parallel and are adapted to make a sealing contact with the pipe ends.

The pipe sections 4 have their ends upset by increasing the thickness of the wall 5 of the pipe at the point where the inward taper of the joint end of the pipe begins. The threaded tapered portions of the pipe ends are of approximately uniform thickness so that the outer threaded face 6 is parallel with the inner face 7. It will therefore be seen that the interior of the pipe where the ends are coupled into the joint converges toward the center of the coupling forming a Venturi passage.

The pipe ends are faced to tightly engage the flange 3 to form a seal, and as there are no external shoulders on the pipe to engage the coupling, this flange limits the screwing up of the joint and takes the end thrust due to the torsional strain in rotation of the drill stem.

To provide resiliency at the flange of the coupling so as to maintain the seal in use, and a spring cushioned end drive, I may make the thrust member as shown in Fig. 2. Here the coupling 1' is formed with two inwardly diverging flanges 8, and the body of the joint is undercut somewhat at 9 at each side of the flanges to obtain a wider resilient stop member. As the flanges diverge inwardly a space 10 is formed between them, allowing the said flanges to be bent toward each other by the screwing up of the joint, thereby forming a yielding stop for the pipe ends, tending to obtain a better seal at that point and also tending to exert a better frictional engagement with the pipe to prevent unscrewing.

It is obvious that in heavy work, the yielding flanges 8 may be strained beyond their elastic limit, tending to break them. In such case I contemplate placing a sectional annular plate 11 in the space 10 between the flanges. Said plate tapers outwardly in thickness and is thinner than is necessary to fill said recess, thus allowing resiliency of the flanges but preventing undue strain longitudinally of the joint. The plate is made in sections so that it can be assembled in position within the recess 10. Its inner face is grooved to form a seat for a resilient ring 12 which is split at one point and acts to force the sections of the plate into position and prevents their loss in use. The ring 11 may be made with inward or outward taper or with parallel sides if desired, depending upon the angles given to the shoulders 8. It is also to be noted that the opposite tube ends screwed into the coupling will support the stop members from undue strain in either direction.

The ends of the pipe sections may be beveled outwardly to a slight extent as shown at 13 in Fig. 3, so that when the joint is screwed up tightly and the yielding flanges 8 are compressed toward each other, the end of the pipe will engage the side of the flange along its entire face. The purpose of this bevel is to obtain a fuller frictional contact along the end of the pipe, as is desirable.

In the use of my improved tool joint, the pipe ends will be screwed into the coarsely threaded and tapered ends of the coupling until the ends of the pipe shoulder bears firmly upon the flanges 3 or 8, making a frictional fluid tight engagement therewith. If, in use, the threads tend to unscrew due to back lash or otherwise, the frictional engagement of the pipe ends with the flanges will resist this tendency, and in case of the yielding flanges 8, there may be a slight unscrewing at the joint and the said flanges will still frictionally engage the ends of the pipe to prevent further unscrewing.

This form of tube interior upset resists effectively inward pressure and provides large end bearing surface, thick wall section where tongs are applied, containing minimum and best distributed amount of material, consistent with the application of stresses the tube is subjected to in use, therefore very economical. It tends to allow minimum resistance to the flow of liquid, at the joint due to its close resemblance to a perfect Venturi orifice.

In considering the transmission of the driving torque of the drill stem through the tool joints, we must consider both thread friction and end thrust of the pipe in the threaded ends of the coupling members. If the thread friction is too great, the joint is not easily unscrewed. If the force is taken up too largely by end thrust members, then the joint is apt to be too loose and liable to accidental unscrewing. As the threads of the joint are subject to wear, some provision is advisable to allow tightening of the joint due to take-up for looseness occasioned by wear. I desire to provide an end thrust member, therefore, which will take up a predetermined thrust but which will yield under increased force to allow a tightening of the pipe in the joint when wear occurs so as to automatically maintain the original correct fit. I propose to make use of controlled areas, and maximum strength of simple or alloyed metal to attain this object.

In Fig. 7 is shown a one-piece tool joint box having integral stop shoulders 3' upon which are mounted rings 14 of fixed area and shape, and whose metallic make-up has a known ultimate strength. These rings are of comparatively soft material and are formed and proportioned to yield or flow, when under a predetermined end thrust of the drill stem sections. As will be noted in Fig. 10, the rings have recesses 15 along their outer and inner margins so as to allow space for the metal to extrude without projecting the metal into the central water passage through the joint.

Upon the yielding ring 14 is placed a saucer-shaped ring 16 known to have lesser spring tension than the pressure that causes the yielding ring metal to flow. Said ring 16 has a relatively small springing range, say between 2 to 3 thousandths of an inch. Upon this spring ring is placed a ring 17 of hard material to form a thrust member, which has a shoulder 18 on its outer end to cooperate with a round spring steel wire snap-ring 19 fitting within a recess in the tool joint body. Said snap ring serves to retain the thrust wings removably in position.

Arbitrarily, for purpose of illustrating, assume the allowable end thrust of 100,000 inch-pounds, and the thread friction drive a value of 200,000 inch-pounds, when ideal conditions exist. When the joint has been made up under above conditions, the saucer spring 16 should be flat, but not have gone beyond its elastic limit. The alloy metal yielding ring 14 resting on the shoulder 3' should have yielded beyond its elastic limit and flown, say $\frac{1}{32}''$ to $\frac{1}{16}''$, and taken a permanent set. Under this condition, the end thrust will always remain constant for any torque, and the thread friction remains the same as under the original tightening force for all torques equal or less than the original tightening force.

For torques less than the maximum previously applied to the connection under consideration, the thread friction is in fact transmitting all the then applied torque, but as soon as the torque is increased up to the previous maximum torque plus static friction in the threads and end thrust members, the yielding alloy ring will resist any further forward movement of the male member into the female member of the tool joints, until the end thrust again overcomes the maximum strength of the alloy ring 14. By continued increase in torque there eventually would be axial movement by the pin into the box, but every new tightening of the joint would leave the original prearranged end thrust value.

This condition will exist until the shell of the tool joint box becomes so thin that it will not be able to carry the bursting force proportionate to the given end thrust and wedging action of the tapered pin. It is apparent that this proportionate readjustment of end thrust and thread friction takes place automatically and continues to take place as long as there is reasonable thickness of the yielding alloy ring ahead of the pin end. By controlling the area of the ring and its composition any desired end thrust may be obtained and gaging tolerances may be much increased. By inserting somewhat worn-out pins in similarly worn boxes, a loose joint would result if the solid stop shoulder were used. Eventually all joints with solid stop shoulders become loose in the threads. When I use the alloy metal ring ahead of the pin end; worn pins and worn boxes may be assembled without risk because the joint may be tonged together until the alloy ring flows or yields enough for proper thread friction.

Figure 6:
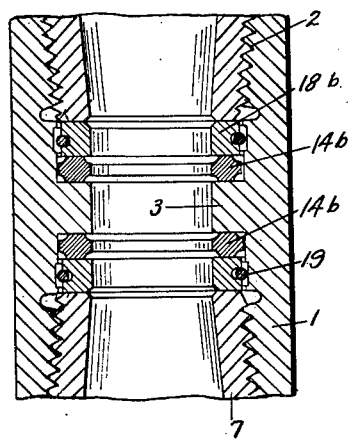
Figure 8:
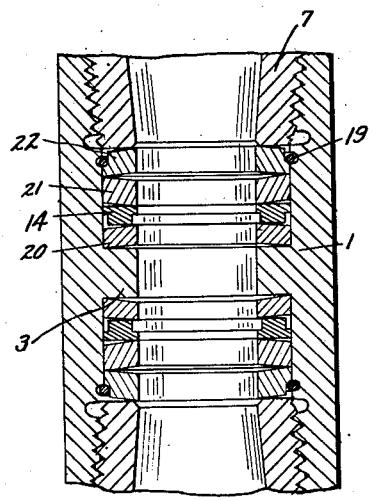

In Figs. 5, 6 and 8 further modifications of this inventive idea are shown. Fig. 5 shows two integral spring flange stop members 24 having a rigid stop plate 11 held in place by the snap ring 12 as previously described. Upon the spring flanges are placed the compressible rings 14ª, outwardly tapered spring rings 16ª and thrust rings 18.

In Fig. 6, the compressible rings 14ᵇ are recessed on opposite sides to allow for flow of the metal. No resilient ring is employed, but the thrust ring 18ᵇ bears directly upon the compressible ring.

In Fig. 8 I show the use of two saucer shaped spring rings 20 and 21 with the compressible ring 14 between them. I also show a third spring ring 22 to engage the end of the pipe. These various modifications of the invention are shown to give an indication of some of the many embodiments which my invention may assume, without departing from the spirit of the invention.

The main advantage of the invention lies in the fact that I am enabled to construct a tool joint of one piece which has means to preserve a fluid tight seal at all times, and which may automatically adjust itself for wear. The joint may not easily unscrew accidentally in use and will wear economically for comparatively long periods.

What I claim as new is:

1. A fluid-sealing tool joint for rotary drill stems including a coupling sleeve having taper threaded boxes at each end thereof, in combination with pipe sections having their ends internally upset to provide friction faces of substantial sizes and being tapered to engage said boxes, and means in said sleeve providing confronting friction faces substantially coextensive with the friction faces of said upsets to frictionally engage the faces of said pipe sections, and form a fluid seal exclusive of the threads and prevent leakage along the threads.

2. In a joint including a coupling sleeve having threaded boxes at its ends and a stop flange intermediate the ends thereof; and a loose ring of compressible metal on each side of said flange, said ring having a recessed formation on at least one edge to provide a flow space when the ring is put under a predetermined end thrust of said drill stem.

3. A tool joint for drill stems including a coupling sleeve having inwardly tapered threaded boxes at its ends, a stop flange intermediate the ends thereof, and a ring of compressible metal on each side of said flange, said ring being adapted to flow under a predetermined end thrust of said drill stem, said ring being recessed to allow space for the metal to extrude under compression.

4. A tool joint for drill stems including a coupling sleeve having inwardly tapered threaded boxes at its ends, a stop flange intermediate the ends thereof, and a ring of compressible metal on each side of said flange, said ring being adapted to flow under a predetermined end thrust of said drill stem, and a spring ring on said compressible ring to engage the end of said drill stem.

5. A tool joint for drill stems including a one piece coupling sleeve, inwardly tapered threaded sockets in said sleeve, a stop member midway of the ends of said sleeve, a resilient ring adjacent said stop member, and an additional ring formed to yield and maintain a permanent set when compressed by a predetermined pressure thereon.

6. A pipe joint including a coupling sleeve, threaded boxes at each end thereof, a plurality of resilient stop members between said boxes, and a ring of rigid material between said members to limit the inward movement of said members in use.

7. A pipe joint including a coupling sleeve, threaded boxes at each end thereof, a plurality of resilient stop members between said sockets, and a ring of rigid material between said members to limit the inward movement of said members in use, said ring being made in sections and means to retain said ring in position.

8. A pipe joint including a coupling sleeve, threaded boxes at each end thereof, a pair of resilient stop members between said sockets, a sectional ring of rigid material between said members, said ring being grooved on its inner face, and a resilient snap ring in said grooved face to hold said ring in position.

9. In a drill stem assemblage, a coupling comprising a sleeve having acutely tapered coarsely threaded boxes, tube sections with acutely tapered coarsely threaded pin ends for engagement therewith, said tube sections being subject to a reverse torque during a drilling operation, the pin ends being inwardly thickened with substantial ends, said ends being faced to provide one component of a fluid seal and an internal pin stop and gauge flange between said boxes with opposite surfaces of an area substantially equal to the adjacent pin ends, said surfaces also being faced to provide the other component of said fluid seal and adapted for making a cooperative engagement to form an internal fluid seal said fluid seal enduring throughout a permissible degree of reverse torque in said tube sections.

10. In a drill stem assemblage, a coupling comprising a sleeve having opposite outwardly acutely tapered coarsely threaded boxes, an internal radial stop flange between said boxes extending past the innermost threads approximately the width of a tube wall, and tube sections with inwardly acutely tapered coarsely threaded pin ends engaging the boxes, the pin end walls being thickened so the approximate wall width is carried beyond the threads for a cooperative engagement with the flange to form a liquid seal with back-lash take-up.

11. A coupling for tubular members comprising a sleeve having an internally threaded box, an internal stop member integral with the box being relatively broad and thin to be capable of yielding, and a tubular member having a threaded pin screwed into the box, said pin exercising a thrust on the stop member causing yielding.

12. A coupling for a rotary drill stem comprising a sleeve having an internally threaded box, on internal stop member integral with the box being relatively broad and thin to be capable of yielding, a pipe having a threaded pin screwed into the box, said pin exercising a thrust on the stop member causing yielding, and a packing assemblage situated between the end of the pin and said stop member, said assemblage including a deformable ring.

13. A coupling for a rotary drill stem comprising a sleeve having an internally threaded box, an internal stop member integral with the box being relatively broad and thin to be capable of yielding, a pipe having a threaded pin screwed into the box, said pin exercising a thrust on the stop member causing yielding, and a ring assemblage situated between said stop member and the end of the pin, said assemblage including a ring of a deformable metal and a ring of resilient metal.

14. A coupling for a rotary drill stem comprising a sleeve having internally threaded boxes, a pair of internal stop members integral with the sleeve at a place medially of the boxes, said members being spaced from each other and being relatively broad and thin so as to be capable of yielding, pipes having threaded pins screwed into the boxes to exercise thrust on the stop members to cause yielding, and a rigid stop plate situated in the space between said members to limit the yielding thereof under said thrust.

15. A fluid-sealing coupling for fluid conductors such as are subject to torque when in use, said coupling comprising a sleeve having inwardly tapered threaded boxes at each end thereof, pipe sections having their pin ends screwed into said boxes, and sealing means in said sleeve to frictionally engage the ends of said pipe sections, portions of said means forming thrust members to establish an internal fluid seal with the ends of said sections, said boxes and said ends being so proportioned that when the pipes are screwed into engagement with the sealing means the boxes will be expanded and the pins put under pressure with an accompanying distortion of threads, to such an extent as to provide for a limited back-lash due to reverse torque without breaking the seal.

16. A pipe joint including a coupling sleeve, threaded boxes at each end thereof, and a plurality of resilient stop members between said boxes.

In testimony whereof, I hereunto affix my signature, this the 16th day of March, A.D. 1931.

GUSTAVUS A. MONTGOMERY.